United States Patent
Inada

(10) Patent No.: US 11,985,396 B2
(45) Date of Patent: May 14, 2024

(54) SYSTEM, INFORMATION PROCESSING DEVICE, INFORMATION PROCESSING METHOD, AND PROGRAM

(71) Applicant: Sony Interactive Entertainment Inc., Tokyo (JP)

(72) Inventor: Tetsugo Inada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 288 days.

(21) Appl. No.: 17/610,534

(22) PCT Filed: Jun. 26, 2019

(86) PCT No.: PCT/JP2019/025306
§ 371 (c)(1),
(2) Date: Nov. 11, 2021

(87) PCT Pub. No.: WO2020/261408
PCT Pub. Date: Dec. 30, 2020

(65) Prior Publication Data
US 2022/0217288 A1    Jul. 7, 2022

(51) Int. Cl.
*H04N 23/11* (2023.01)
*G02B 5/20* (2006.01)

(52) U.S. Cl.
CPC ............ *H04N 23/11* (2023.01); *G02B 5/208* (2013.01)

(58) Field of Classification Search
CPC .................. H04N 23/11; G02B 5/208
See application file for complete search history.

(56) References Cited

U.S. PATENT DOCUMENTS

| | | |
|---|---|---|
| 7,435,943 B1 | 10/2008 | Chen |
| 9,389,693 B2 | 7/2016 | Lee |
| | (Continued) | |

FOREIGN PATENT DOCUMENTS

| | | |
|---|---|---|
| CN | 101276826 A | 10/2008 |
| CN | 109461173 A | 3/2019 |
| | (Continued) | |

OTHER PUBLICATIONS

Extended European Search Report for corresponding EP Application No. 19934585.1, 7 pages, dated Jan. 2, 2023.
(Continued)

*Primary Examiner* — Kyle M Lotfi
(74) *Attorney, Agent, or Firm* — Matthew B. Dernier, Esq.

(57) ABSTRACT

Provided is a system that includes an event-driven vision sensor and an information processing device. The event-driven vision sensor includes a sensor array where a first sensor and a second sensor are arranged in a predetermined pattern. The first sensor generates a first event signal when detecting a change in an intensity of light incident through a first filter. The first filter selectively passes light in a first wavelength band. The second sensor generates a second event signal when detecting a change in an intensity of light incident through a second filter. The second filter selectively passes light in a second wavelength band that is different from the first wavelength band. The information processing device includes a first processing section and a second processing section. The first processing section executes a first process on the basis of the first event signal. The second processing section executes a second process different from the first process on the basis of the second event signal.

16 Claims, 8 Drawing Sheets

(56) References Cited

U.S. PATENT DOCUMENTS

| | | |
|---|---|---|
| 10,337,914 B2 | 7/2019 | Kim |
| 10,516,841 B2 | 12/2019 | Kim |
| 11,122,224 B2 | 9/2021 | Suh |
| 2008/0237453 A1 | 10/2008 | Chen |
| 2014/0320403 A1 | 10/2014 | Lee |
| 2016/0187196 A1 | 6/2016 | Kim |
| 2018/0146149 A1 | 5/2018 | Suh |
| 2018/0262703 A1 | 9/2018 | Kim |
| 2018/0295298 A1 | 10/2018 | Zamir |

FOREIGN PATENT DOCUMENTS

| | | |
|---|---|---|
| EP | 3037921 A2 | 6/2016 |
| JP | 2014535098 A | 12/2014 |
| JP | 2018085725 A | 5/2018 |
| JP | 2018148553 A | 9/2018 |
| KR | 20160079532 A | 7/2016 |

OTHER PUBLICATIONS

Notice of Reasons for Refusal for corresponding JP Application No. 2021-528725, 8 pages, dated Jan. 31, 2023.
Notice of Preliminary Rejection for corresponding KR Application No. 10-2021-7040435, 11 pages, dated Aug. 22, 2023.
International Search Report for corresponding PCT Application No. PCT/JP2019/025306, 2 pages, dated Sep. 10, 2019.
Office Action for corresponding CN Application No. 201980097631.0, 23 pages, dated Oct. 19, 2023.

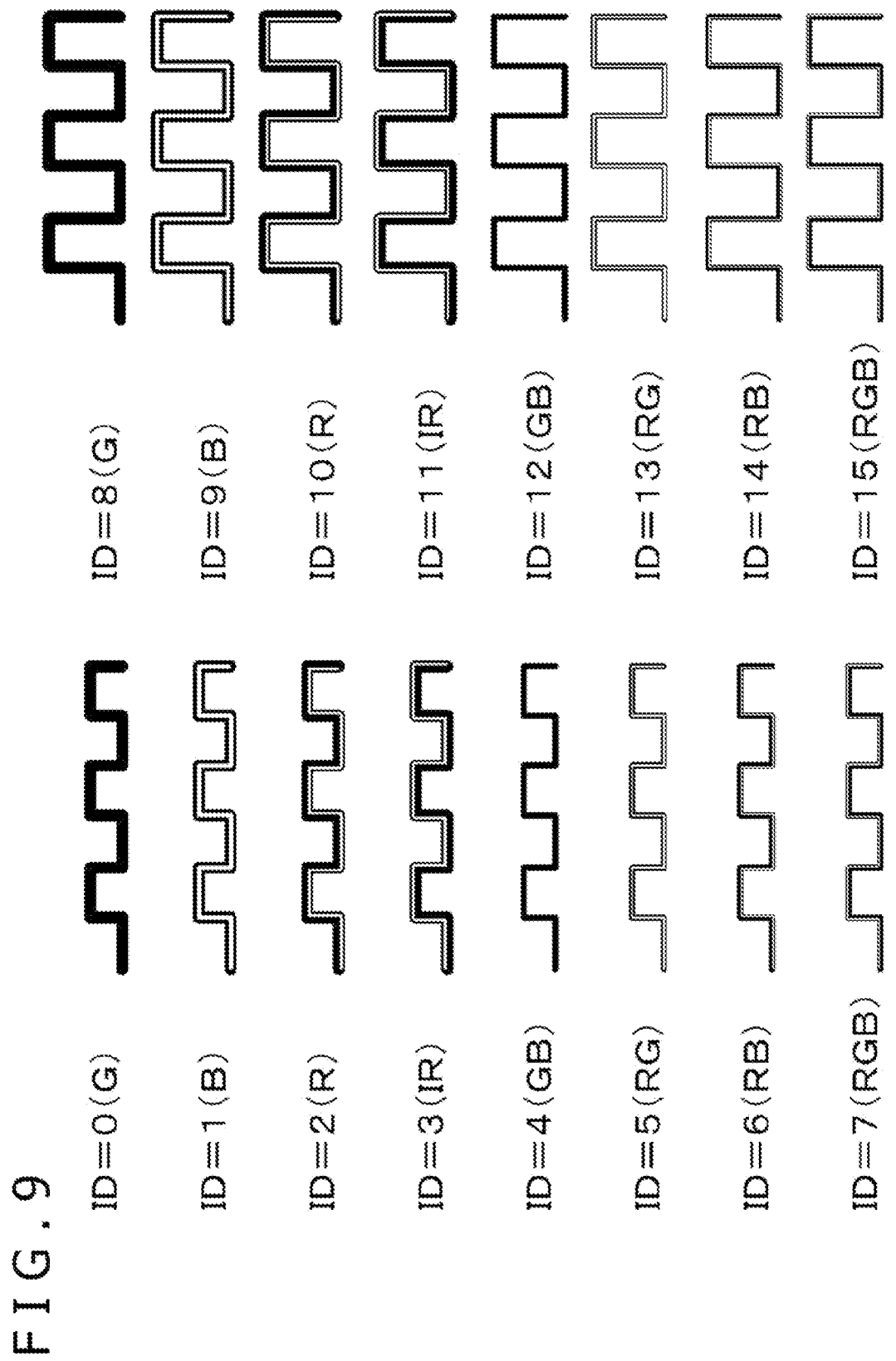

SYSTEM, INFORMATION PROCESSING DEVICE, INFORMATION PROCESSING METHOD, AND PROGRAM

TECHNICAL FIELD

The present invention relates to a system, an information processing device, an information processing method, and a program.

BACKGROUND ART

There is known an event-driven vision sensor that allows pixels to detect a change in an intensity of incident light and to asynchronously generate a signal. The event-driven vision sensor is advantageous in being operable at a high speed with low power consumption compared to a frame-based vision sensor configured to scan all pixels at each predetermined cycle, or more specifically, an image sensor such as a CCD (Charge Coupled Device) image sensor or a CMOS (Complementary Metal Oxide Semiconductor) image sensor. Technologies related to such event-driven vision sensors are described, for example, in PTL 1 and PTL 2.

CITATION LIST

Patent Literature

[PTL 1] Japanese Translation of PCT for Patent No. 2014-535098 [PTL 2] Japanese Patent Laid-open No. 2018-85725

SUMMARY

Technical Problem

However, although the above-mentioned advantage of event-driven vision sensors is known, it can hardly be said that peripheral technologies based on characteristics different from those of conventional vision sensors, such as frame-based vision sensors, are adequately proposed.

In view of the above circumstances, an object of the present invention is to provide a system, an information processing device, an information processing method, and a program that, when processing is to be executed based on an event signal generated when a change in the intensity of light is detected by an event-driven vision sensor, make it possible to execute different processes depending on a wavelength band of light in which the intensity change has occurred.

Solution to Problem

According to an aspect of the present invention, there is provided a system including an event-driven vision sensor ha includes a sensor array where a first sensor and a second sensor are arranged in a predetermined pattern, the first sensor generating a first event signal when detecting a change in an intensity of light incident through a first filter, the first filter selectively passing light in a first wavelength band, the second sensor generating a second event signal when detecting a change in an intensity of light incident through a second filter, the second filter selectively passing light in a second wavelength band that is different from the first wavelength band, and an information processing device that includes a first processing section and a second processing section, the first processing section executing a first process on the basis of the first event signal, the second processing section executing a second process different from the first process on the basis of the second event signal.

According to another aspect of the present invention, there is provided an information processing device including a first processing section that executes a first process, on the basis of a first event signal that a first sensor generates when detecting a change in an intensity of light incident through a first filter, the first sensor being arranged in a predetermined pattern in a sensor array of an event-driven vision sensor, the first filter selectively passing light in a first wavelength band, and a second processing section that executes a second process, on the basis of a second event signal that a second sensor generates when detecting a change in an intensity of light incident through a second filter, the second process being different from the first process, the second sensor being arranged together with the first sensor in the predetermined pattern in the sensor array, the second filter selectively passing light in a second wavelength band that is different from the first wavelength band.

According to yet another aspect of the present invention, there is provided an information processing method including the steps of executing a first process, on the basis of a first event signal that a first sensor generates when detecting a change in an intensity of light incident through a first filter, the first sensor being arranged in a predetermined pattern in a sensor array of an event-driven vision sensor, the first filter selectively passing light in a first wavelength band, and executing a second process, on the basis of a second event signal that a second sensor generates when detecting a change in an intensity of light incident through a second filter, the second process being different from the first process, the second sensor being arranged together with the first sensor in the predetermined pattern in the sensor array, the second filter selectively passing light in a second wavelength band that is different from the first wavelength band.

According to still another aspect of the present invention, there is provided a program for causing a computer to function as an information processing device that includes a first processing section that executes a first process, on the basis of a first event signal that a first sensor generates when detecting a change in an intensity of light incident through a first filter, the first sensor being arranged in a predetermined pattern in a sensor array of an event-driven vision sensor, the first filter selectively passing light in a first wavelength band, and a second processing section that executes a second process, on the basis of a second event signal that a second sensor generates when detecting a change in an intensity of light incident through a second filter, the second process being different from the first process, the second sensor being arranged together with the first sensor in the predetermined pattern in the sensor array, the second filter selectively passing light in a second wavelength band that is different from the first wavelength band.

According to the above-described configurations, when processing is to be executed based on an event signal generated when a change in the intensity of light is detected by an event-driven vision sensor, it is possible to execute different processes depending on the wavelength band of light in which the intensity change has occurred.

BRIEF DESCRIPTION OF DRAWINGS

FIG. 9 is a diagram illustrating an example of a marker's blinking pattern in a specific example of the third embodiment.

DESCRIPTION OF EMBODIMENTS

Preferred embodiments of the present invention will now be described in detail with reference to the accompanying drawings. In this document and the accompanying drawings, components having substantially identical functional configurations are designated by the same reference signs and will not be redundantly described.

First Embodiment

Figure 1:
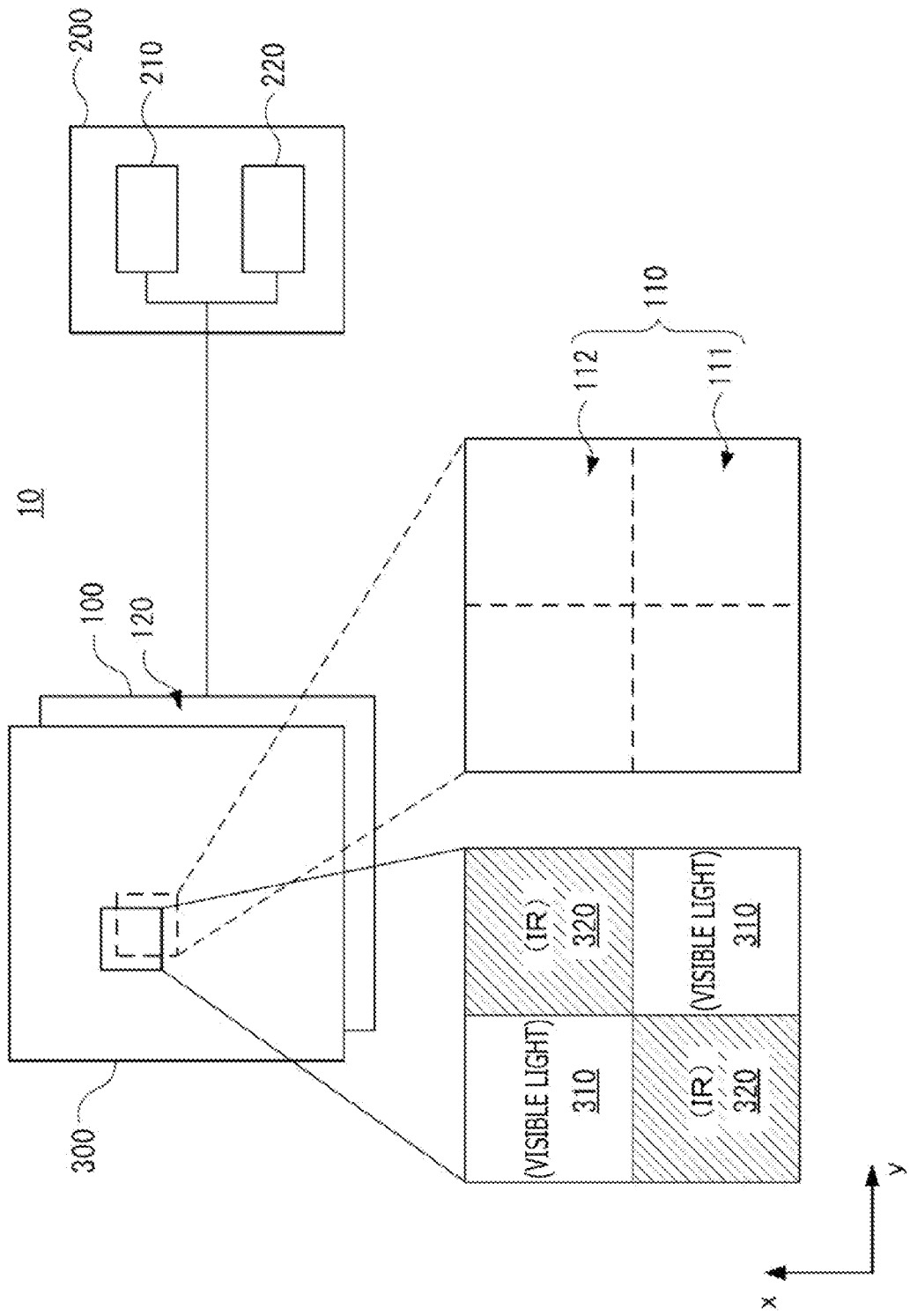
FIG. 1 is a diagram illustrating a schematic configuration of a system according to a first embodiment of the present invention.

FIG. 1 is a diagram illustrating a schematic configuration of a system according to a first embodiment of the present invention. In an example depicted in FIG. 1, a system 10 includes a vision sensor 100 and an information processing device 200. The vision sensor 100, which is of an event-driven type, includes a sensor array 120 where sensors 110 are arranged. The sensors 110 generate event signals when detecting a change in an intensity of light incident through an undepicted optical system, or more specifically, when detecting a luminance change in the light. If a sensor 110 detects no intensity change in the light, this sensor 110 does not generate an event signal. Therefore, the vision sensor 100 asynchronously generates the event signals. The event signals outputted from the vision sensor 100 include sensor identification information (e.g., the position of a pixel), the polarity of luminance change (luminance increase or decrease), and a timestamp.

In the present embodiment, a filter 300 corresponding to the vision sensor 100 is disposed. The filter 300 includes first filters 310 and second filters 320. The first filters 310 selectively pass light in a first wavelength band. The second filters 320 selectively pass light in a second wavelength band that is different from the first wavelength band. The first filters 310 and the second filters 320 are alternately arranged in two directions on a plane (depicted as an x-direction and a y-direction orthogonal to each other). The filter 300 is disposed such that the first filters 310 and the second filters 320 respectively correspond to one or more sensors 110 in the vision sensor 100.

Consequently, in the present embodiment, the sensors 110 include first sensors 111 on which light is incident through the first filters 310, and second sensors 112 on which light is incident through the second filters 320. The first sensors 111 and the second sensors 112 are arranged in a predetermined pattern in the sensor array 120, or more specifically, arranged in the same pattern as that of the first filters 310 and the second filters 320 included in the filter 300. First event signals generated by the first sensors 111 and second event signals generated by the second sensors 112 can be distinguished from each other by the sensor identification information included in the event signals.

The information processing device 200 includes, as functional parts, a first processing section 210 and a second processing section 220. The first processing section 210 and the second processing section 220 are implemented by a computer having, for example, a communication interface, a processor, and a memory, and realized by allowing the processor to operate according to a program stored in the memory or received through the communication interface. The first processing section 210 executes a first process on the basis of the first event signals generated by the first sensors 111 in the vision sensor 100. Meanwhile, the second processing section 220 executes a second process on the basis of the second event signals generated by the second sensors 112 in the vision sensor 100. The second process is different from the second process. More specifically, in a case where a light intensity change (event) has occurred only in the first wavelength band at a position in the angle of view of the vision sensor 100, only the first sensors 111 generate the first event signals to let only the first processing section 210 execute processing. Meanwhile, in a case where the event has occurred only in the second wavelength band at another position in the angle of view of the vision sensor 100, only the second sensors 112 generate the second event signals to let only the second processing section 220 execute processing.

Further, the information processing device 200 may be, for example, incorporated in the same hardware as the vision sensor 100, may be a terminal device disposed in the same space as the vision sensor 100 to communicate with the vision sensor 100, or may be a server device connected to the vision sensor 100 through a network. An alternative is to allow the terminal device to implement some functions of the information processing device 200 and allow the server device to implement the other functions.

When, for example, the vision sensor 100 and the filter 300 are incorporated in a game controller, the above-described system 10 can be used for a process of estimating the own position of the game controller on the basis of an event detected by the vision sensor 100. In this case, the first filters 310 included in the filter 300 selectively pass the light in the visible light region, and the second filters 320 selectively pass the light in the infrared light region. In the information processing device 200, the first processing section 210 executes a position/posture calculation process by using surrounding environment information, on the basis of the first event signals that the first sensors 111 generate when detecting visible light events. Meanwhile, the second processing section 220 corrects the position and the posture calculated by processing performed by the first processing section 210, on the basis of the second event signals that the second sensors 112 generate when detecting infrared light events emitted by IR (infrared) markers disposed around the game controller. This correction reduces drift errors that occur in a case where only the position/posture calculation process using the surrounding environment information is executed.

Figure 2:
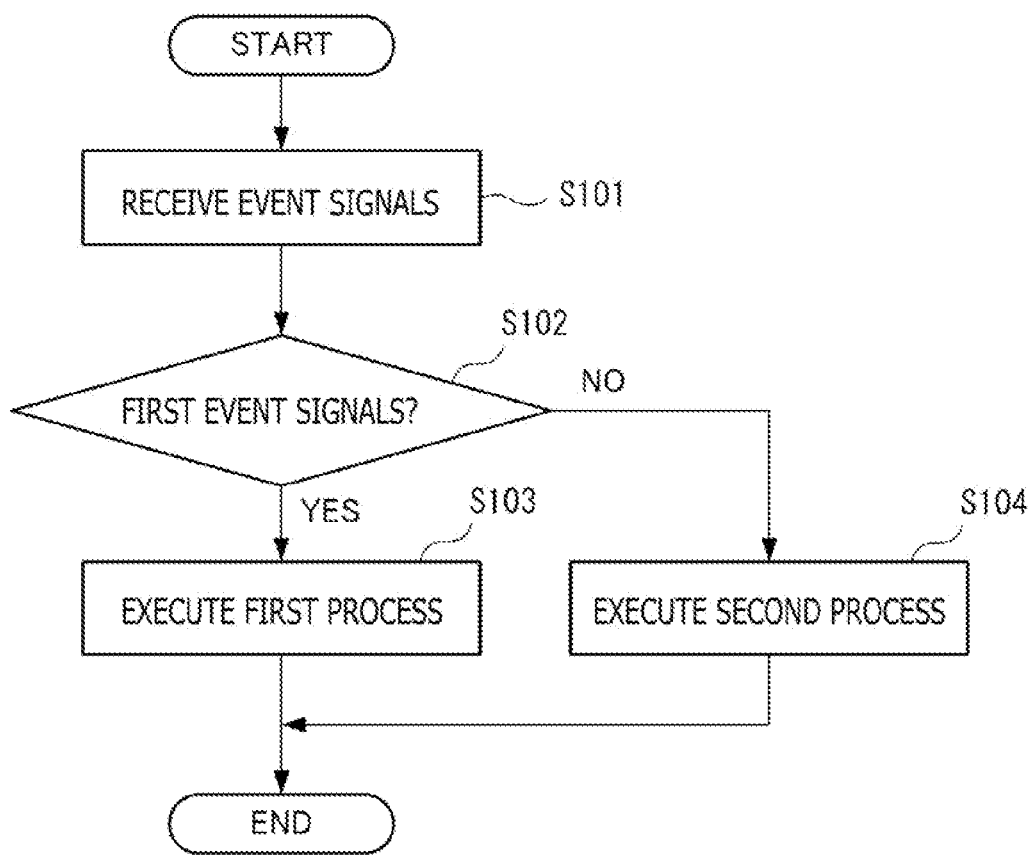
FIG. 2 is a flowchart illustrating an example of processing in the first embodiment of the present invention.

FIG. 2 is a flowchart illustrating an example of processing in the first embodiment of the present invention. In the example depicted in FIG. 2, in a case where event signals received by the information processing device 200 (step S101) are the first event signals generated by the first sensors 111 included in the vision sensor 100 ("YES" in step S102), the first processing section 210 executes the first process (step S103). Meanwhile, in a case where the received event signals are not the first event signals, but are the second event signals generated by the second sensors 112 included in the vision sensor 100 ("NO" in step S102), the second processing section 220 performs the second process (step S104).

Figure 3:
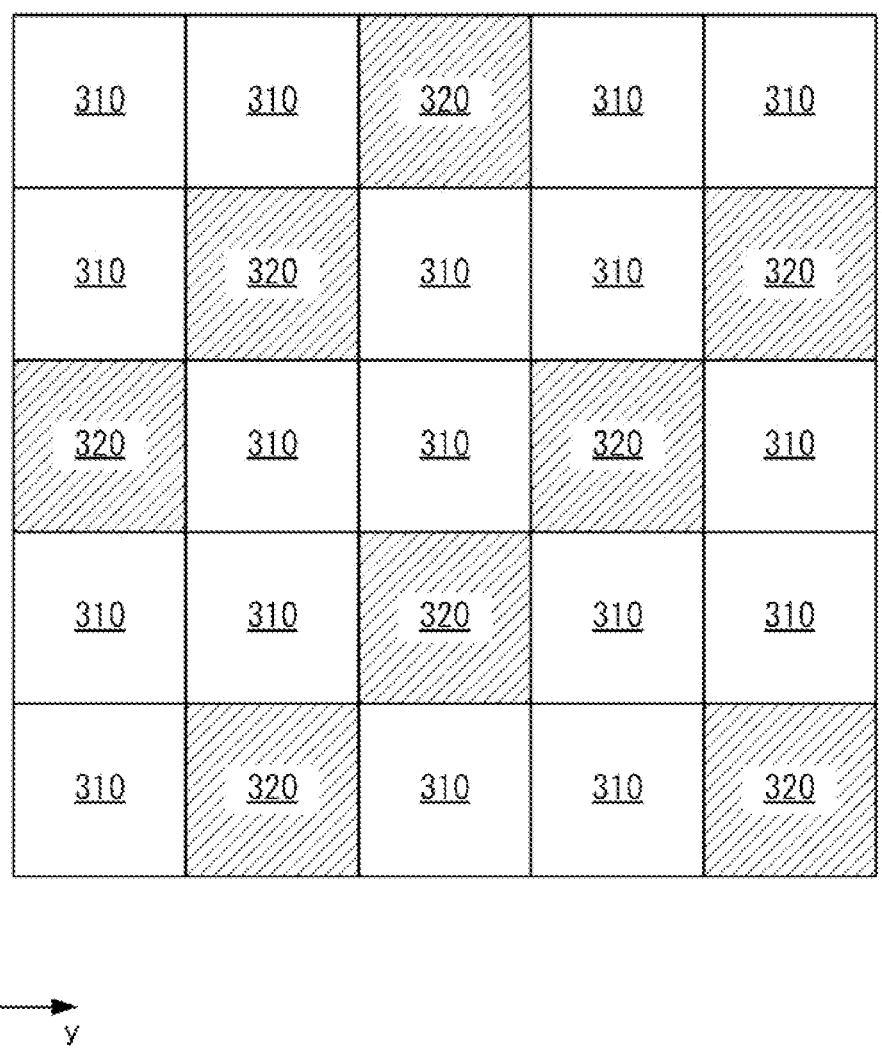
FIG. 3 is a diagram illustrating an alternative example of a filter and sensor arrangement pattern in the first embodiment of the present invention.

FIG. 3 is a diagram illustrating an alternative example of a filter and sensor arrangement pattern in the first embodiment of the present invention. In the example depicted in FIG. 3, the first filters 310 and the second filters 320 are unevenly arranged in the filter 300. More specifically, although the first filters 310 and the second filters 320 are alternately arranged in two directions on a plane (depicted as the x-direction and the y-direction orthogonal to each other), the ratio between the first filters 310 and the second filters 320 is 2:1 in each direction. In the sensors 110, too, the first and second sensors 111 and 112 are similarly arranged in an uneven pattern. For example, in a case where, in the above-mentioned process of estimating the own position, an infrared light event occurs in a region three times as large as a filter size in the x-direction and the y-direction due to the IR markers having a sufficient size, the infrared light event is surely detected even if the second filters 320 are spaced apart from each other in the arrangement pattern depicted in the example of the FIG. 3. In this case, arranging the filters and the sensors in the above-described uneven pattern makes it possible to relatively enlarge the region of the first filters 310 and thus increase the resolution of the visible light event.

Second Embodiment

Figure 4:
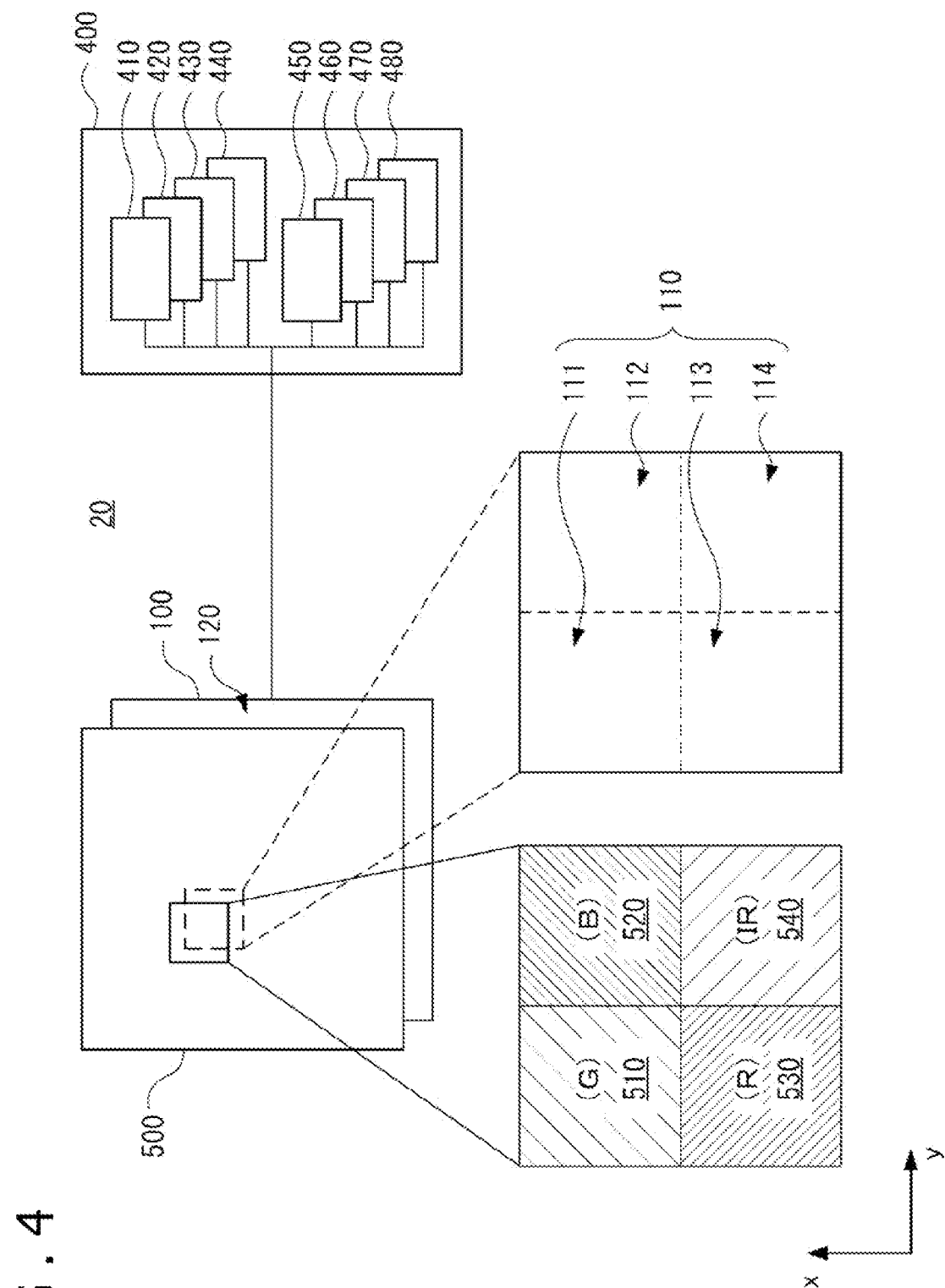
FIG. 4 is a diagram illustrating a schematic configuration of a system according to a second embodiment of the present invention.

FIG. 4 is a diagram illustrating a schematic configuration of a system according to a second embodiment of the present invention. In an example depicted in FIG. 4, a system 20 includes the vision sensor 100, which is of the event-driven type, and an information processing device 400. In the present embodiment, the vision sensor 100 has the same configuration as in the first embodiment. However, a filter 500 disposed in correspondence with the vision sensor 100 includes first to fourth filters 510 to 540, which selectively pass light in four different respective wavelength bands. The first to fourth filters 510 to 540 are arranged in such a pattern that they are alternately disposed in two directions on a plane (depicted as the x-direction and the y-direction orthogonal to each other) in correspondence with the one or more sensors 110 of the vision sensor 100, respectively.

Consequently, in the present embodiment, the sensor 110 are divided into first to fourth sensors 111 to 114 on which light is incident respectively through the first to fourth filters 510 to 540. The first to fourth sensors 111 to 114 are arranged in a predetermined pattern in the sensor array 120, or more specifically, arranged in the same pattern as that of the first to fourth filters 510 to 540 included in the filter 500. As is the case with the first embodiment described above, first to fourth event signals respectively generated by the first to fourth sensors 111 to 114 can be distinguished from one another by the sensor identification information included in the event signals.

The information processing device 400 includes, as functional parts, first to eighth processing sections 410 to 480. The first to eighth processing sections 410 to 480 are implemented by a computer having, for example, a communication interface, a processor, and a memory, and realized by allowing the processor to operate according to a program stored in the memory or received through the communication interface. Of the first to eighth processing sections 410 to 480, the first to fourth processing sections 410 to 440 in the information processing device 400 execute first to fourth processes, which are different from one another, on the basis of the first to fourth event signals respectively generated by the first to fourth sensors 111 to 114 in the vision sensor 100, as is the case with the first and second processing sections 210 and 220 in the first embodiment described earlier.

Meanwhile, the fifth to eighth processing sections 450 to 480 in the information processing device 400 execute fifth to eighth processes, which are different from one another (also different from the first to fourth processes mentioned above), on the basis of event signals that are generated simultaneously or successively at predetermined or shorter time intervals by two or more of the first to fourth sensors 111 to 114 in the vision sensor 100. For example, in a case where a change has occurred in the intensity of light in two wavelength bands at a position in the angle of view of the vision sensor 100, the event signals are generated by the sensors on which light is incident through the filters that selectively pass light in the respective wavelength bands. Therefore, the fifth to eighth processing sections 450 to 480 execute the predetermined processes on the basis of the event signals that are generated simultaneously or at the predetermined or shorter time intervals by two or more different sensors adjacent or close to each other in the arrangement pattern of the first to fourth sensors 111 to 114.

Figure 5:
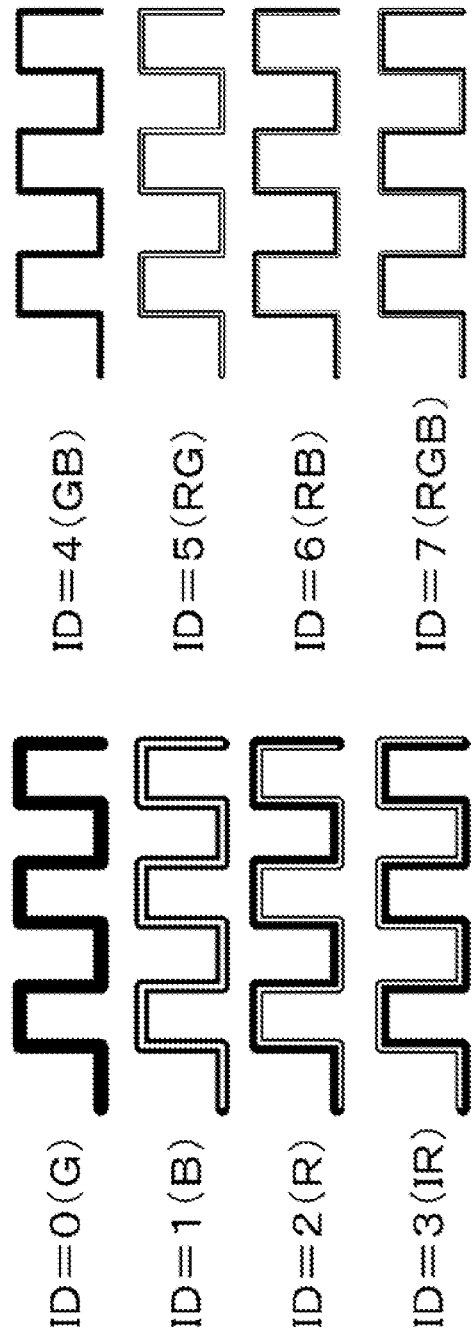
FIG. 5 is a diagram illustrating an example of a marker's blinking pattern in a specific example of the second embodiment.
Figure 6:
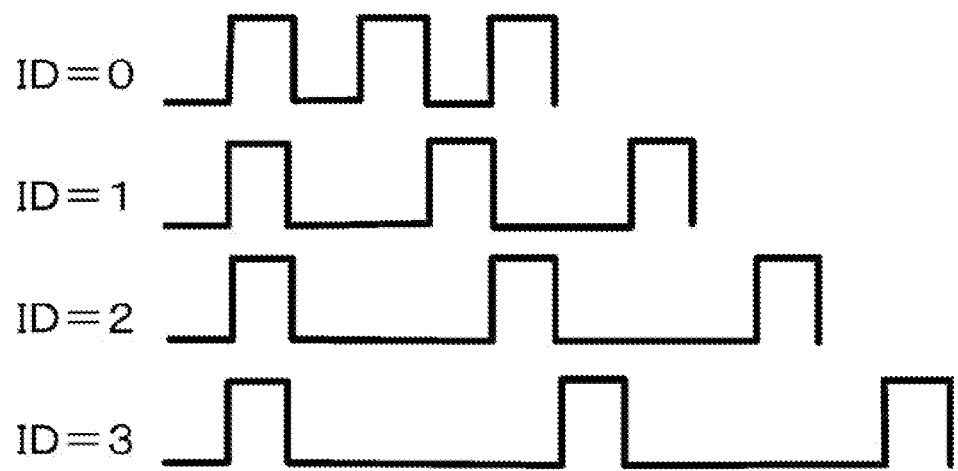
FIG. 6 is a diagram illustrating the marker's blinking pattern in a case where the wavelength band of light remains unchanged.

The above-described system 20 can be used for a process of tracking markers that are configured to emit light having different wavelengths and are attached to a plurality of objects moving in the angle of view of the vision sensor 100. For example, in a case where the first to fourth filters 510 to 540 selectively pass light in the green, blue, red, and infrared light regions, respectively, the system 20 is able to identify and track the markers that emit light having eight different wavelengths in a predetermined blinking pattern as depicted in FIG. 5. In a case, for example, where the wavelength band of light remains unchanged as described in conjunction with the present embodiment, it is necessary to vary the marker's blinking pattern as depicted in FIG. 6 in order to identify the markers with use of the event signals. In this case, however, the cycle of the blinking pattern becomes longer with an increase in the number of types of markers to be identified. This increases latency despite the use of an event-driven vision sensor that operates at a high speed. An example of the present embodiment makes it possible to identify, for example, eight different markers while maintaining latency by applying the same blinking pattern to the markers as depicted in FIG. 5. In this case, the first to eighth processing sections 410 to 480 of the information processing device 400 execute a process of tracking different types of markers, respectively.

Figure 7:
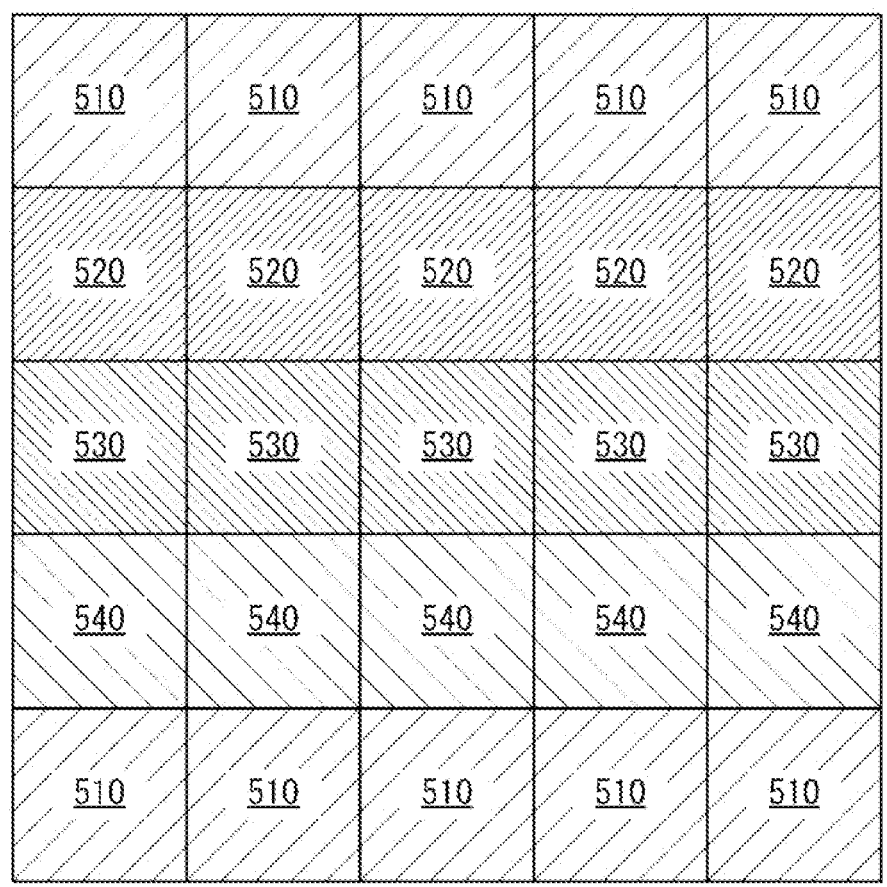
FIG. 7 is a diagram illustrating an alternative example of a filter and sensor arrangement pattern in the second embodiment of the present invention.

FIG. 7 is a diagram illustrating an alternative example of a filter and sensor arrangement pattern in the second embodiment of the present invention. In the above-described example depicted in FIG. 4, the first to fourth filters 510 to 540 included in the filter 500 are arranged alternately in two directions on a plane (depicted as the x-direction and the y-direction orthogonal to each other). In the example depicted in FIG. 7, however, the first to fourth filters 510 to 540 are arranged alternately only in the x-direction. In other words, the first to fourth filters 510 to 540 are arranged in a striped pattern in the y-direction. In the sensors 110, too, the first to fourth sensors 111 to 114 are arranged in a similar striped pattern. In this case, an event occurring in a region less than four times as large as the filter size may be blocked in the x-direction by a filter passing light in a different wavelength band. However, such blocking does not occur in the y-direction. Meanwhile, in the above-described example depicted in FIG. 4, an event occurring in a region two or more times as large as the filter size is detected in both the x-direction and the y-direction without being blocked. As described above, the filter and sensor arrangement pattern can be changed as needed depending, for example, on the size of an event to be detected in respective directions.

Third Embodiment

Figure 8:
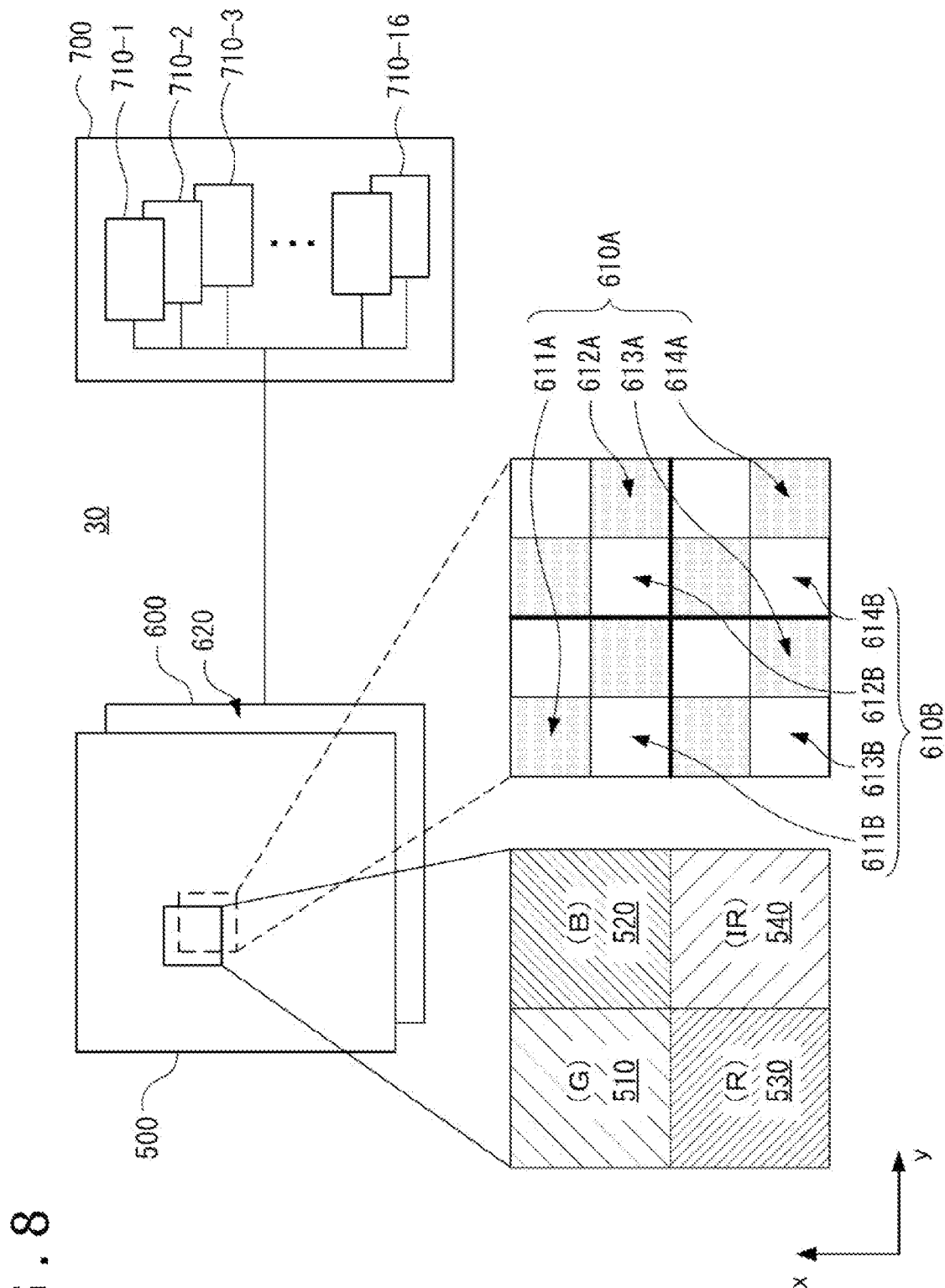
FIG. 8 is a diagram illustrating a schematic configuration of a system according to a third embodiment of the present invention.

FIG. 8 is a diagram illustrating a schematic configuration of a system according to a third embodiment of the present invention. In an example depicted in FIG. 8, a system 30 includes a vision sensor 600, which is of an event-driven type, and an information processing device 700. In the present embodiment, the filter 500 disposed in correspondence with the vision sensor 600 has a configuration similar to that of the second embodiment described earlier. However, the sensors arranged in a sensor array 620 of the vision sensor 600 include sensors 610A and sensors 610B. The sensors 610A are in a first subgroup whose light intensity change detection threshold value is set to a first threshold value. The sensors 610B are in a second subgroup whose light intensity change detection threshold value is set to a second threshold value that is smaller than the first threshold value. The sensors 610A in the first subgroup and the sensors 610B in the second subgroup are disposed so as to respectively include first to fourth sensors 611A to 614A and 611B to 614B. Beams of light transmitted through the first to fourth filters 510 to 540 are respectively incident on the first to fourth sensors 611A to 614A and 611B to 614B. In other words, in the present embodiment, the first sensors 611A and 611B include the sensor 611A in the first subgroup and the sensor 611B in the second subgroup. The same is true for the second to fourth sensors.

The information processing device 700 includes, as functional Parts, 16 processing sections 710-1, 710-2, . . . , 710-16. The processing sections 710-1, 710-2, . . . , 710-16 are implemented by a computer having, for example, a communication interface, a processor, and a memory, and realized by allowing the processor to operate according to a program stored in the memory or received through the communication interface. The processing section 710-1, which is one of the functional parts, executes a predetermined process when event signals are generated by both the sensor 611A in the first subgroup and the sensor 611B in the second subgroup, which are included in the vision sensor 600. The processing section 710-2 executes a process different from the process executed by the processing section 710-1 when an event signal is generated by the sensor 611B in the second subgroup although no event signal is generated by the sensor 611A in the first subgroup. Stated differently, in the present embodiment, the first processing section (the first processing section 410 in the second embodiment), which executes the first process on the basis of the first event signals generated by the first sensors 611A and 611B, executes two different subprocesses, according to the above-mentioned type of event signal generation by the sensors 611A and 611B in the individual subgroups. The same is true for the relation between the processing sections 710-3 to 710-16 and the second to eighth processing sections 420 to 480 in the second embodiment. It should be noted that the term "subprocesses" is merely used to compare with the processes executed, for example, by the first processing section in the first and second embodiments. The details of the subprocesses may be the same as those of the processes executed, for example, by the first processing section in the first and second embodiments.

The above-described system 30 can be used for a process of tracking markers that are attached to a plurality of objects moving in the angle of view of the vision sensor 600, as is the case with the second embodiment described earlier. For example, the system 30 is able to identify and track 16 different markers that emit light having eight different wavelengths in two blinking patterns differing in light intensity, as depicted in FIG. 9. The two different blinking patterns include a first pattern and a second pattern. The first pattern blinks at a light intensity not lower than a detection threshold value of the sensor 610A in the first subgroup. The second pattern blinks at a light intensity lower than the detection threshold value of the sensor 610A in the first subgroup and not lower than the detection threshold value of the sensor 610B in the second subgroup. An example of the present embodiment makes it possible to identify more different markers while maintaining latency by applying the same blinking pattern to the markers, as is the case with the second embodiment. In this case, the processing sections 710-1 to 710-16 of the information processing device 700 execute a process of tracking different types of markers, respectively. For example, an alternative may be to set three or more different blinking intensities for the markers, define three or more sensor subgroups having threshold values corresponding to the respective blinking intensities, and thus execute a larger number of different processes, or more specifically, track different types of markers.

According to the foregoing embodiments of the present invention, when an information processing device executes processing based on event signals generated by event-driven vision sensors corresponding to filters that are disposed to selectively pass light in a predetermined wavelength band in correspondence with the event-driven vision sensors, it is possible to execute different processes depending on the wavelength band of light in which an intensity change has occurred. Although the resolution of event detection decreases with an increase in the number of types of filters, such a resolution decrease can be compensated for by publicly-known technologies such as interpolation and extrapolation.

It should be noted that modifications described in conjunction with one of the foregoing embodiments are also applicable to another one of the foregoing embodiments. For example, the uneven arrangement pattern of filters and sensors in the first embodiment, which is described with reference to FIG. 3, is also applicable to the second and third embodiments. Further, the striped arrangement pattern of filters and sensors in the second embodiment, which is described with reference to FIG. 7, is also applicable to the first and third embodiments. In the third embodiment, the sensor 610A in the first subgroup and the sensor 610B in the second subgroup may be arranged in a striped pattern in the x-direction or the y-direction instead of being each alternately arranged in the x-direction and the y-direction.

The embodiments of the present invention can be used in a situation where, for example, game controllers, smartphones, and various moving vehicles (e.g., automobiles, electric vehicles, hybrid electric vehicles, motorcycles, bicycles, personal mobilities, airplanes, drones, and robots) acquire information regarding a surrounding environment, estimate the own position from the position of a peripheral object, or detect a flying object and take evasive action.

While the preferred embodiments of the present invention have been described in detail with reference to the accompanying drawings, the present invention is not limited to such preferred embodiments. It should be understood that various modifications and corrections will become apparent to persons of ordinary skill in the art, and that such modifications and corrections are intended to be obviously included within the technical scope described in claims.

REFERENCE SIGNS LIST 10, 20, 30: System
100, 600: Event-driven vision sensor
110: Sensor
120: Sensor array
200, 400, 700: Information processing device
210: First processing section
220: Second processing section
300, 500: Filter

The invention claimed is:

1. A system comprising:
an event-driven vision sensor that includes a sensor array where a first sensor and a second sensor are arranged in a predetermined pattern, the first sensor generating a first event signal when detecting a change in an intensity of light incident through a first filter, the first filter selectively passing light in a first wavelength band, the second sensor generating a second event signal when detecting a change in an intensity of light incident through a second filter, the second filter selectively passing light in a second wavelength band that is different from the first wavelength band; and
an information processing device that includes a first processing section and a second processing section, the first processing section executing a first process on a basis of the first event signal, the second processing section executing a second process different from the first process on a basis of the second event signal,
wherein the second process corrects calculations performed by the first process.

2. The system according to claim 1, wherein
the first filter selectively passes light in a visible light region, and
the second filter selectively passes light in an infrared light region.

3. The system according to claim 1, wherein
the sensor array is configured such that a third sensor is arranged in the predetermined pattern together with the first sensor and the second sensor, the third sensor generating a third event signal when detecting a change in an intensity of light incident through a third filter, the third filter selectively passing light in a third wavelength band that is different from the first wavelength band and the second wavelength band, and
the information processing device further includes a third processing section that executes a third process on a basis of the third event signal.

4. The system according to claim 1, wherein the information processing device further includes a fourth processing section, the fourth processing section executing a fourth process on a basis of the first event signal and the second event signal that are generated simultaneously or successively at predetermined time intervals, or time intervals shorter than the predetermined time intervals, by the first sensor and the second sensor adjacent or close to each other in the predetermined pattern.

5. The system according to claim 1, wherein
at least the first sensor includes a sensor in a first subgroup and a sensor in a second subgroup, the first subgroup having a first threshold value as a light intensity change detection threshold value, the second subgroup having a second threshold value as the light intensity change detection threshold value, the second threshold value being smaller than the first threshold value, and
at least the first processing section executes a first subprocess when the first event signals are generated by both the sensor in the first subgroup and the sensor in the second subgroup, and executes a second subprocess different from the first subprocess when the first event signal is generated by the sensor in the second subgroup and not by the sensor in the first subgroup.

6. The system according to claim 1, wherein
the sensor array is configured such that the first sensor and the second sensor are each arranged in a first direction and a second direction, the second direction being orthogonal to the first direction, and
the predetermined pattern is configured such that the first sensor and the second sensor are each alternately arranged in the first direction and the second direction.

7. The system according to claim 1, wherein
the sensor array is configured such that the first sensor and the second sensor are each arranged in a first direction and a second direction, the second direction being orthogonal to the first direction, and
the predetermined pattern is configured such that the first sensor and the second sensor are arranged alternately only in the first direction.

8. An event-driven vision sensor comprising:
a sensor array where a first sensor and a second sensor are arranged in a predetermined pattern, the first sensor generating a first event signal when detecting a change in an intensity of light incident through a first filter, the first filter selectively passing light in a first wavelength band, the second sensor generating a second event signal when detecting a change in an intensity of light incident through a second filter, the second filter selectively passing light in a second wavelength band that is different from the first wavelength band,
wherein the first event signal is provided to a first processing section that performs a calculation and the second event signal is provided to a second processing section that performs a correction of the calculation.

9. The vision sensor according to claim 8, wherein
the first filter selectively passes light in a visible light region, and
the second filter selectively passes light in an infrared light region.

10. The vision sensor according to claim 8, wherein the sensor array is configured such that a third sensor is arranged in the predetermined pattern together with the first sensor and the second sensor, the third sensor generating a third event signal when detecting a change in an intensity of light incident through a third filter, the third filter selectively passing light in a third wavelength band that is different from the first wavelength band and the second wavelength band.

11. The vision sensor according to claim 8, wherein at least the first sensor includes a sensor in a first subgroup and a sensor in a second subgroup, the first subgroup having a first threshold value as a light intensity change detection threshold value, the second subgroup having a second threshold value as the light intensity change detection threshold value, the second threshold value being smaller than the first threshold value.

12. The vision sensor according to claim 8, wherein
the sensor array is configured such that the first sensor and the second sensor are each arranged in a first direction and a second direction, the second direction being orthogonal to the first direction, and
the predetermined pattern is configured such that the first sensor and the second sensor are each alternately arranged in the first direction and the second direction.

13. The vision sensor according to claim 8, wherein
the sensor array is configured such that the first sensor and the second sensor are each arranged in a first direction and a second direction, the second direction being orthogonal to the first direction, and
the predetermined pattern is configured such that the first sensor and the second sensor are arranged alternately only in the first direction.

14. An information processing device comprising:
a first processing section that executes a first process, on a basis of a first event signal that a first sensor generates when detecting a change in an intensity of light incident through a first filter, the first sensor being arranged in a predetermined pattern in a sensor array of an event-driven vision sensor, the first filter selectively passing light in a first wavelength band; and
a second processing section that executes a second process, on a basis of a second event signal that a second sensor generates when detecting a change in an intensity of light incident through a second filter, the second process being different from the first process, the second sensor being arranged together with the first sensor in the predetermined pattern in the sensor array, the second filter selectively passing light in a second wavelength band that is different from the first wavelength band,
wherein the second process corrects calculations performed by the first process.

15. An information processing method comprising:
executing a first process, on a basis of a first event signal that a first sensor generates when detecting a change in an intensity of light incident through a first filter, the first sensor being arranged in a predetermined pattern in a sensor array of an event-driven vision sensor, the first filter selectively passing light in a first wavelength band; and
executing a second process, on a basis of a second event signal that a second sensor generates when detecting a change in an intensity of light incident through a second filter, the second process being different from the first process, the second sensor being arranged together with the first sensor in the predetermined pattern in the sensor array, the second filter selectively passing light in a second wavelength band that is different from the first wavelength band,
wherein the second process corrects calculations performed by the first process.

16. A non-transitory, computer readable storage medium containing a program, which when executed by a computer, causes the computer to perform an information processing method by carrying out actions, comprising:
executing a first process, on a basis of a first event signal that a first sensor generates when detecting a change in an intensity of light incident through a first filter, the first sensor being arranged in a predetermined pattern in a sensor array of an event-driven vision sensor, the first filter selectively passing light in a first wavelength band; and
executing a second process, on a basis of a second event signal that a second sensor generates when detecting a change in an intensity of light incident through a second filter, the second process being different from the first process, the second sensor being arranged together with the first sensor in the predetermined pattern in the sensor array, the second filter selectively passing light in a second wavelength band that is different from the first wavelength band,
wherein the second process corrects calculations performed by the first process.

\* \* \* \* \*